US012122067B2

(12) United States Patent
Zheng et al.

(10) Patent No.: US 12,122,067 B2
(45) Date of Patent: Oct. 22, 2024

(54) METHOD FOR CUTTING SILICON ROD AND APPARATUS FOR DIMAOND MULTI-WIRE CUTTING

(71) Applicant: XUZHOU XINJING SEMICONDUCTOR TECHNOLOGY CO., LTD., Jiangsu (CN)

(72) Inventors: Jiazhen Zheng, Jiangsu (CN); Kinpeng Low, Jiangsu (CN); Haitang Gao, Jiangsu (CN)

(73) Assignee: ZHONGHUAN ADVANCED SEMICONDUCTOR TECHNOLOGY CO., LTD., Jiangsu (CN)

( * ) Notice: Subject to any disclaimer, the term of this patent is extended or adjusted under 35 U.S.C. 154(b) by 179 days.

(21) Appl. No.: 17/279,600

(22) PCT Filed: Jul. 24, 2020

(86) PCT No.: PCT/CN2020/104070

§ 371 (c)(1),
(2) Date: Mar. 25, 2021

(87) PCT Pub. No.: WO2021/013238

PCT Pub. Date: Jan. 28, 2021

(65) Prior Publication Data

US 2022/0134600 A1 May 5, 2022

(30) Foreign Application Priority Data

Jul. 24, 2019 (CN) ............................ 201910671681
Jul. 24, 2019 (CN) ............................ 201910671692
Jul. 24, 2019 (CN) ............................ 201910672370
Jul. 24, 2019 (CN) ............................ 201921178864

(51) Int. Cl.
*B28D 7/02* (2006.01)
*B28D 5/04* (2006.01)

(52) U.S. Cl.
CPC ............... *B28D 7/02* (2013.01); *B28D 5/045* (2013.01)

(58) Field of Classification Search
CPC ........... B24B 27/06; B23Q 11/10; B28D 1/02; B28D 5/00; B28D 5/04; B28D 7/00; B28D 5/045; B28D 7/02; H01L 21/304
USPC ........................................................... 125/21
See application file for complete search history.

(56) References Cited

FOREIGN PATENT DOCUMENTS

| | | | |
|---|---|---|---|
| CN | 1788965 | A | 6/2006 |
| CN | 101979230 | A | 2/2011 |
| CN | 102626959 | A | 8/2012 |
| CN | 102700015 | A | 10/2012 |
| CN | 202507408 | U | 10/2012 |

(Continued)

OTHER PUBLICATIONS

The first search report of priority CN patent application No. 2019106716817 issued on Feb. 27, 2024.

*Primary Examiner* — Katina N. Henson
(74) *Attorney, Agent, or Firm* — Samson G. Yu

(57) ABSTRACT

Provided are a method for cutting silicon rod and an apparatus for diamond multi-wire cutting, the method for cutting silicon rod includes: using a cooling pipe to supply cutting fluid to the diamond wire, and using the diamond wire to cut the silicon rod, wherein the distance between the supply position of the cutting fluid and the periphery of the silicon rod is 10-20 mm; or adjusting the new wire running amount and/or feed speed at different positions of the crystal cross section during the cutting process.

19 Claims, 7 Drawing Sheets

(56) References Cited

FOREIGN PATENT DOCUMENTS

| | | | |
|---|---|---|---|
| CN | 103434030 | A | 12/2013 |
| CN | 203391130 | U | 1/2014 |
| CN | 203409906 | U | 1/2014 |
| CN | 105382951 | A | 3/2016 |
| CN | 106938503 | A | 7/2017 |
| CN | 207373492 | U | 5/2018 |
| CN | 207535114 | U | 6/2018 |
| CN | 108608591 | A | 10/2018 |
| CN | 208035037 | U | 11/2018 |
| CN | 110370477 | A | 10/2019 |
| CN | 110370480 | A | 10/2019 |
| CN | 110466085 | A | 11/2019 |
| CN | 210732873 | U | 6/2020 |
| EP | 0798091 | A2 | 10/1997 |
| EP | 0798091 | A3 | 8/1998 |
| JP | 0985736 | A | 3/1997 |

METHOD FOR CUTTING SILICON ROD AND APPARATUS FOR DIMAOND MULTI-WIRE CUTTING

TECHNICAL FIELD

The present disclosure relates to the field of silicon rod cutting.

BACKGROUND

The existing method for silicon rod cutting mainly are adopting slurry cutting and diamond wire cutting. The slurry cutting uses a high-speed moving steel wire to drive the slurry attached to the steel wire to rub the silicon rod to achieve the cutting effect. The slurry cutting needs controlling a variety of process materials and long process time. The diamond wire cutting mainly uses high-speed steel wire to drive abrasives with high strength and sharp edge angles to cut silicon rods. The diamond wire cutting can simplify the process conditions and greatly shorten the cutting process time, but the shortening of the process time also causes the instability of the cutting.

For small-dimension silicon rod, the slurry cutting adopts oil-based with large usage wire, and can be cut at a fixed feed speed. Generally, the diamond wire cutting has fixed usage wire and fixed feed speed. But with the dimension of silicon rod become larger, the TTV (total thickness deviation) value of the silicon wafer is too large by the existing cutting method whether slurry cutting or diamond wire cutting, resulting in low yield and high cost.

Besides, diamond wire cutting previously mainly used for photovoltaic materials, which has a shape of square column and a low flatness requirement, Therefore, the diamond multi-wire cutting can be completely introduced without affecting the yield. However, the semiconductor silicon rod is cylindrical, the cutting area greatly changed with the cutting progressing, resulting in worse cutting stability, and affect the yield. The introduction of diamond multi-wire cutting technology in multi-wire cutting of semiconductor silicon rod needs further research and improvement.

SUMMARY

The present disclosure aims to solve one of technical problems in related technologies.

In one aspect of the present disclosure, a method for cutting silicon rod is provided. According to an embodiment of the present disclosure, this method comprises: adjusting the new wire running amount and/or feed speed at different positions of the crystal cross section during the cutting process, or using a cooling pipe to supply cutting fluid to the diamond wire, and using the diamond wire to cut the silicon rod, wherein the distance between the supply position of the cutting fluid and the periphery of the silicon rod is 10-20 mm.

First of all, according to an embodiment of the present disclosure a method for cutting silicon rod, the supply position of through the cooling pipe to supply cutting fluid to the diamond wire, that is, the contact position of cutting fluid and diamond wire, the distance between the supply position of the cutting fluid and the periphery of the silicon rod is 10-20 mm, to ensure the largest contact area between the cutting fluid and the being cut silicon wafer, effectively avoiding the side-to-side swing of the diamond wire during cutting caused by the formation of cutting fluid accumulation between the diamond wire and the silicon rod, thereby reducing the TTV or warp and improving the quality of the as-cut silicon wafer. Secondly, by adjusting the new wire running amount and/or feed speed at different positions of the crystal cross section during the cutting process, can maintain the same cutting ability during the cutting process, ensure the stability of the cutting, improve the processing performance, and especially reduce the TTV value of the silicon wafer.

In addition, a method for cutting silicon rod according to the above embodiment of the present disclosure can also have the following additional technical features:

In some embodiments of the present disclosure, two cooling pipes are used to supply cutting fluid to the diamond wire. Therefore, the quality of the as-cut silicon wafer can be improved.

In some embodiments of the present disclosure, the two cooling pipes are arranged symmetrically with the silicon rod. Therefore, the quality of the as-cut silicon wafer can be improved.

In some embodiments of the present disclosure, the cooling pipe is provided with a flow regulating valve.

In some embodiments of the present disclosure, the cooling pipe is provided with a supporting bracket, and the supporting bracket fixes the cooling pipe.

In some embodiments of the present disclosure, the cutting fluid is supplied to the diamond wire by arranging a nozzle on the cooling pipe, and the flow rate of the cutting fluid is controlled by the nozzle during the cutting process, wherein the cutting depth of the diamond wire is less than ¼ diameter of the silicon rod, preferably less than ⅛ diameter of the silicon rod, the flow rate of the cutting fluid is 25-30 L/min; the cutting depth of the diamond wire is greater than ¾ diameter of the silicon rod, preferably greater than ⅞ diameter of the silicon rod, the flow rate of the cutting fluid is 25-30 L/min; the cutting depth of the diamond wire is ¼-¾ of the diameter of the silicon rod, preferably ⅛-⅞ diameter of the silicon rod, the flow rate of the cutting fluid is 20-25 L/min. Therefore, the quality of the as-cut silicon wafer can be guaranteed.

In some embodiments of the present disclosure, a guide plate is provided at the outlet of the cooling pipe, and that one end of the guide plate is connected to the outlet of the cooling pipe, and the other end of the guide plate is set at the supply position of the cutting fluid, the flow rate of the cutting fluid is controlled by guide plate during the cutting process, wherein: the cutting depth of the diamond wire is less than ¼ diameter of the silicon rod, preferably less than ⅛ diameter of the silicon rod, the flow rate of the cutting fluid is 100~120 L/min; the cutting depth of the diamond wire is greater than ¾ diameter of the silicon rod, preferably greater than ⅞ diameter of the silicon rod, the flow rate of the cutting fluid is 100~120 L/min; the cutting depth of the diamond wire is ¼-¾ of the diameter of the silicon rod, preferably ⅛-⅞ diameter of the silicon rod, The flow rate of the cutting fluid is 50~70 L/min. Therefore, the quality of the as-cut silicon wafer can be guaranteed.

In some embodiments of the present disclosure, the supporting bracket is an adjustment component that can move up and down, back and forth, and the spraying position of the cutting fluid is controlled by adjusting the angle of the adjustment component.

In some embodiments of the present disclosure, the angle adjustment of the adjustment component is according to the following formula:

$$\theta = \arctan\frac{\frac{y}{2} - \sqrt{R^2 - (R-x)^2}}{Z},$$

wherein, θ is the adjusted angle, the unit is degree, y is the distance between the two cooling pipes, the unit is mm, Z is the height between the cooling pipe and the spool motor, the unit is mm, R is the diameter of the silicon rod, the unit is mm, and x is The cutting depth of the diamond wire, the unit is mm.

In some embodiments of the present disclosure, the cutting fluid is water. Therefore, the cleanliness of the equipment can be improved while ensuring the quality of the as-cut silicon wafer.

In some embodiments of the present disclosure, an automatic water supplement device is used to supply water to the diamond wire through the cooling pipe. Therefore, the quality of the as-cut silicon wafer can be guaranteed.

In some embodiments of the present disclosure, during the cutting process, the tension of the diamond wire is 23-25 N, the linear speed of the diamond wire spool motor is 700-1500 m/min, and the cutting speed is 0.6-1.2 mm/min.

In some embodiments of the present disclosure, when adjusting the new wire running amount and/or the feed speed at different positions of the crystal cross section, this method is a slurry cutting method or diamond wire cutting method.

In some embodiments of the present disclosure, this method is a slurry cutting method, and the cutting feed speed is adjusted during the cutting process, wherein:

during the cutting process, the loop running amount is set to 500~800 m/min, the new wire running amount is 850~950 m/min, and the difference between the new wire running amount and the loop running amount is greater than 5% of the loop running amount, and the feed speed is set according to formula 1:

$$Vx = \frac{R}{\sqrt{R^2 - (R-x)^2}} Vc \quad \text{(Formula 1)}$$

Vx is the feed speed at the cutting position x,

R is the radius of the silicon rod, x is the feed length along the cutting direction, Vc is the feed speed at the cutting position x=R, Vc=0.6~1.2 mm/min.

In some embodiments of the present disclosure, this method is a slurry cutting method, and the new wire running amount is adjusted during the cutting process, wherein:

before starting the cutting process, the loop running amount is set to 500~800 m/min, the feed speed Vc=0.6~1.2 mm/min;

after the cutting process is started, the loop running amount and the feed speed remain unchanged, the new wire running amount is adjusted according to formula 2:

$$Wx = \frac{\sqrt{R^2 - (R-x)^2}}{R^2} Wc \quad \text{(formula 2)}$$

Wx is the new wire running amount at the cutting position x,

R is the radius of the silicon rod, x is the feed length along the cutting direction, Wc is the new wire running amount at the cutting position, Wc=850~950 m/min.

In some embodiments of the present disclosure, the cutting feed speed or the, new wire running amount is adjusted in at least 45 steps during the cutting process. During the cutting process, if the cutting speed or new wire running amount is kept same, the cutting ability for different cutting area will be unstable, and the steel wire receives uniform force at all steps of the cutting area by adjusting the cutting speed and/or the new wire running amount, which ensures the stability of cutting and improves the TTV quality of the silicon wafer.

In some embodiments of the present disclosure, during the cutting process, the tension of the steel wire is stabilized in the range of 30-35 N, and the linear speed of the cutting process is 700-1500 m/min. The slurry cutting mainly uses 1400# and 1600# wires, and keep the tension stable at 30~35 N. If the tension is too large, the wire will break easily. If the tension is too small, the cutting force will be insufficient, which will affect the surface quality. And with a certain line speed, the cutting is more stable and the quality is more stable.

In some embodiments of the present disclosure, this method is a diamond wire cutting method. During the cutting process, the new wire running amount is adjusted when the cutting feed position is 0-15% and 85-100% of the diameter of the silicon rod, and/or the cutting feed speed is adjusted when the cutting feed position is 15-85% of the diameter of the silicon rod.

In some embodiments of the present disclosure, this method is a diamond wire cutting method, the new wire running amount is adjusted according to the following steps:

before starting the cutting process, the loop running amount is set to 500~800 m/min, the first new wire running amount is 850~950 m/min, the feed speed is 0.6~1.2 mm/min;

after the cutting process is started, the loop running amount and the feed speed remain unchanged, the first new wire running amount is adjusted to the second new wire running amount, and the second new wire running amount is adjusted according to formula 3:

$$\text{The second new wire running amount} = \frac{R}{\sqrt{R^2 - (R-x)^2}} \times \text{The first new wire running amount}, \quad \text{(formula 3)}$$

R is the radius of the silicon rod, x is the feed length along the cutting direction.

In some embodiments of the present disclosure, the feed speed is 0.6 mm/min.

In some embodiments of the present disclosure, this method is a diamond wire cutting method, the feed speed is adjusted according to the following steps:

during the cutting process, the loop running amount is set to 500~800 m/min, the new wire running amount is 850~950 m/min, the feed speed is set according to formula 4:

$$Vx = \frac{R}{\sqrt{R^2 - (R-x)^2}} Vc \quad \text{(Formula 4)}$$

Vx is the feed speed at the cutting position x,

R is the radius of the silicon rod, x is the feed length along the cutting direction, Vc is the feed speed at the cutting position x=R, Vc=0.6~1.2 mm/min.

In some embodiments of the present disclosure, this method is a diamond wire cutting method, and the cutting fluid is water or water-based. In the above cutting process, pure water or water-based is used as the cutting fluid, the water-based as the cutting fluid is normal use in the internal circulation production, that the silicon powder easy on the surface of the silicon wafer. If internal circulation is not used for production, no dirt remains on the surface of the silicon wafer, that can be degummed directly without using any detergent for cleaning, under this condition, pure water is used as a cutting fluid to improve the cleanliness of the surface of the silicon wafer after cutting, effectively guarantee the quality of the silicon wafer.

In some embodiments of the present disclosure, the feed speed or the new wire running amount is adjusted in at least 45 steps during the cutting process. During the cutting process, same cutting speed or the running amount of wire with different cutting area will result in unstable cutting ability. By adjusting the cutting speed and/or the running amount of wire to ensure the force on the steel wire within the cutting area in each step is uniform, which ensures the stability of cutting and improves the TTV quality of silicon wafer.

In some embodiments of the present disclosure, during the cutting process the tension of the steel wire is stabilized in the range of 20-35 N, and the linear speed of the cutting process is 700-1500 m/min. Diamond wire cutting mainly uses 1200# and 1400# wires, and keep the tension stable at 30~35 N. If the tension is too large, the wire will break easily. If the tension is too small, the cutting force will be insufficient, which will affect the surface quality. And with a certain line speed, the cutting is more stable and the quality is more stable.

The loop running amount in the present disclosure refers to the amount of wire returned in each loop during the entire cutting process; the new wire running amount refers to the amount of wire delivered in each loop from the designated cutting beginning during the entire cutting process; the feed speed refers to the feed speed of the fixed silicon rod during at the rod position of the entire cutting process.

In second aspect of the present disclosure, the present disclosure also discloses an apparatus for diamond multi-wire cutting, which includes according to an embodiment of the disclosure:

the fixed plate;

the lifting mechanism, the lifting mechanism includes lifting cylinder and lifting platform, the lifting cylinder is arranged on the lifting platform and connected with the bottom wall of the fixed plate;

the swing mechanism, the swing mechanism includes fixed part, shaft pin and rotating part, the fixed part and the rotating part are relatively rotatable connected by the shaft pin, the fixed part is connected with the bottom wall of the lifting platform, and the bottom end of the rotating part is suitable for installing the silicon rod to be cut;

the pressure detection mechanism, includes pressure sensing device which is arranged between the swing mechanism and the lifting mechanism, and the pressure sensing device collects the perceived stress of the wire bow for the diamond multi-wire cutting apparatus during operation.

Therefore, the apparatus for diamond multi-wire cutting of the above-mentioned embodiment of the present disclosure has the swing device, which can relatively swing with different cutting positions, reducing the effect of the change in the force area on the wire bow from the starting position to the final position during the cutting process, Therefore, effectively improving the warp. Meanwhile, the apparatus for diamond multi-wire cutting in the above embodiment has the pressure detection mechanism, which can sense the pressure of the wire bow through the contact between the swing mechanism and the wire bow, and provide a reference for stable control of the wire bow. Therefore, the apparatus for diamond multi-wire cutting according to the embodiment of the present disclosure can maintain the stability of the wire bow, increase the yield, and improve the warp, TTV and nanotopography.

In addition, the apparatus for diamond multi-wire cutting according to the above embodiment of the present disclosure can also have the following additional technical features:

In some embodiments of the present disclosure, the pressure detection mechanism includes: control processing device, the control processing device is connected to the pressure sensing device, the control processing device is connected to the lifting mechanism and/or the swing mechanism, and the control processing device analyzes and processes the pressure value fed back by the pressure sensing device and performs automatic pressure compensation by adjusting the lifting mechanism or/and the swing mechanism.

In some embodiments of the present disclosure, the stable bow value of the wire is 1-3 mm.

In some embodiments of the present disclosure, the lifting mechanism further includes limit feed column, which is arranged between the lifting platform and the fixed plate and is parallel to the lifting cylinder.

In another aspect of the present disclosure, the present disclosure also proposes a method for cutting silicon rods using the apparatus of diamond multi-wire cutting described in the previous embodiment, In this method, the swing angle $$\theta_x = \frac{\sqrt{R^2 - (R - x)^2}}{R \times \theta_M},$$

where, $\theta_x$ is the angle at the cutting position x, $\theta_M$ is the angle at the maximum cutting position, R is the radius of the silicon rod, and x is the cutting length along the feed direction.

In some embodiments of the present disclosure, the swing angle of the rotating part at the maximum cutting area is 0-12 degrees.

In some embodiments of the present disclosure, the swing angle of the rotating part at the maximum cutting area is 6~12 degrees.

Additional aspects and advantages of the present disclosure are given in the following description, and a part becomes apparent from the following description, or is learned through practice of the present disclosure.

BRIEF DESCRIPTION OF THE DRAWINGS

The above and/or additional aspects and advantages of the present disclosure become apparent and are easily understood from description of embodiments in combination with the following drawings, it is to be noted that.

DETAILED DESCRIPTION OF THE EMBODIMENTS

Figure 1:
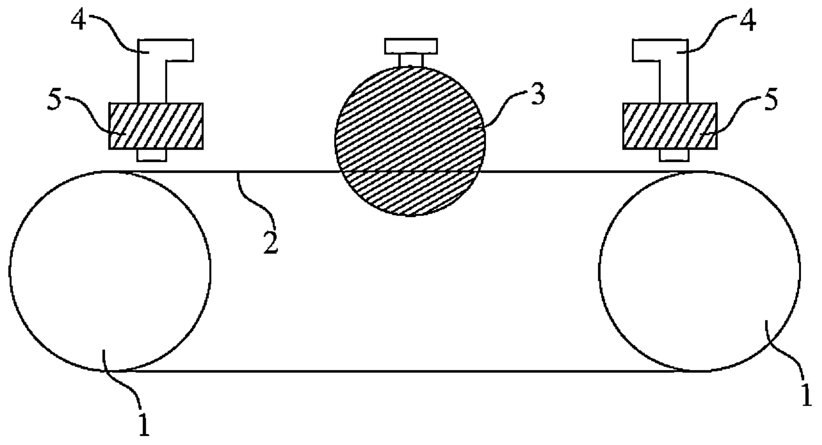
FIG. 1 is a process structure diagram of a method for cutting silicon rod according to an embodiment of the present disclosure.

Embodiments of the present disclosure are described in detail below, examples of the embodiments are shown in the drawings, herein the same or similar reference numbers represent the same or similar elements or elements having the same or similar functions from beginning to end. The embodiments described below with reference to the drawings are exemplary, and are intended to explain the present disclosure, but not understood as limitation to the present disclosure.

In the description of the present disclosure, unless specifically stated and defined otherwise, the terms “installed”, “linked”, “connected”, “fixed” and other terms should be understood in a broad sense, for example, it can be a fixed connection or a detachable connection, or integrated; it can be mechanically connected or electrically connected; it can be directly connected or indirectly connected through an intermediary, it can be the internal communication of two components or the interaction relationship between two components, unless defined otherwise. For those of ordinary skill in the art, the specific meanings of the above terms in the present disclosure can be understood according to specific circumstances.

In the present disclosure, unless specifically stated and defined otherwise, a first feature “above” or “below” a second feature can be direct contact of the first and second features, or indirect contact of the first and second features through an intermediate medium. In addition, the first feature “above”, “on” and “up” the second feature can be that the first feature is directly above or slantwise above the second feature, or it just simply means that a horizontal height of the first feature is greater than that of the second feature. The first feature “below”, “under” and “down” the second feature can be that the first feature is directly below or slantwise below the second feature, or it just simply means that the horizontal height of the first feature is less than that of the second feature.

In one aspect of the present disclosure, the present disclosure a method for cutting silicon rod. According to an embodiment of the present disclosure, this method includes: adjusting the new wire running amount and/or feed speed at different positions of the crystal cross section during the cutting process, or using a cooling pipe to supply cutting fluid to the diamond wire, and using the diamond wire to cut the silicon rod, wherein the distance between the supply position of the cutting fluid and the periphery of the silicon rod is 10-20 mm.

According to an embodiment of the present disclosure, using a cooling pipe to supply cutting fluid to the diamond wire, and using the diamond wire to cut the silicon rod, wherein the distance between the supply position of the cutting fluid and the periphery of the silicon rod is 10-20 mm. This step is described in detail below.

According to an embodiment of the present disclosure, in this step, fix the silicon rod to be cut on the machine table. It should be noted that this process is a conventional operation in the field and will not be repeated here, and then the cooling pipe is used to supply cutting fluid to the diamond wire, and the diamond wire is used to cut the silicon rod, wherein the distance between the supply position of the cutting fluid and the periphery of the silicon rod is 10-20 mm, such as 10 mm, 11 mm, 12 mm, 13 mm, 14 mm, 15 mm, 16 mm, 17 mm, 18 mm, 19 mm and 20 mm. The inventor found that the cutting fluid is supplied to the required position through the cooling pipe, the distance between the supply position of the cutting fluid and the periphery of the silicon rod is 10-20 mm, to ensure the largest contact area between the cutting fluid and the being cut silicon wafer, effectively avoiding the side-to-side swing of the diamond wire during cutting caused by the formation of cutting fluid accumulation between the diamond wire and the silicon rod, thereby reducing the TTV or warp and improving the quality of the as-cut silicon wafer.

Further, two cooling pipes are used to supply the cutting fluid to the diamond wire, preferably the two cooling pipes are arranged symmetrically with the silicon rod. Therefore, the cutting fluid simultaneously be supplied from both sides of the silicon rod to being cut silicon rod with two cooling pipes, and the quality of the as-cut silicon wafer can be improved.

Specifically, referring to FIG. 1, the diamond wire 2 is driven by two spool motors 1 to run back and forth to cut the silicon rod 3 during the cutting process, the tension of the diamond wire is maintained at 23-25 N, such as 23 N, 24 N and 25 N. the linear speed of spool motor is 700~1500 m/min, such as 700 m/min, 800 m/min, 900 m/min, 1000 m/min, 1100 m/min, 1200 m/min, 1300 m/min, 1400 m/min and 1500 m/min, the cutting speed is 0.6~1.2 m/min, such as 0.6 mm/min, 0.7 mm/min, 0.8 mm/min, 0.9 mm/min, 1.0 mm/min, 1.1 mm/min and 1.2 mm/min. And a supporting bracket 5 is set on the cooling pipe 4 (the supporting bracket 5 can be any component that can realize the fixing function in the prior art, and those skilled in the art can choose according to actual needs) to fix the cooling pipe 4, so that the supply position of the cutting fluid in the cooling pipe 4 is on the periphery of the silicon rod 3 at the cutting maximum area. Meanwhile, the inventor found that due to the very low adhesion of the cutting fluid and the distance from the silicon rod is short, that is easier to be brought into the silicon rod by the diamond wire to form a chip removal effect, and a proper flow of cutting fluid is required, excessive cutting fluid can easily cause the liquid to agglomerate on the periphery of the silicon rod to form a turbulence, resulting in the swing of diamond wire when diamond wire quickly enter into the silicon rod. Therefore, this application through the distance between the supply position of the cutting fluid and the periphery of the silicon rod is 10-20 mm, to ensure the largest contact area between the cutting fluid and the being cut silicon wafer, effectively avoiding the side-to-side swing of the diamond wire during cutting caused by the formation of cutting fluid accumulation between the diamond wire and the silicon rod, thereby reducing the TTV or warp and improving the quality of the as-cut silicon wafer.

Figure 2:
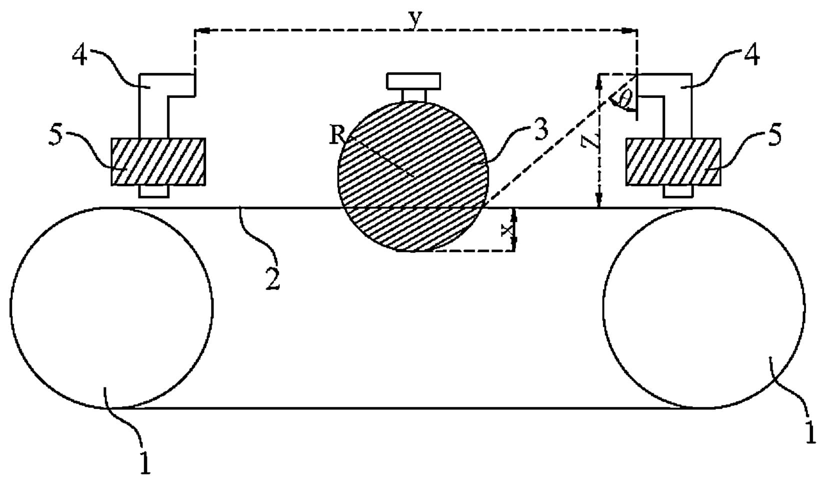
FIG. 2 is a process structure diagram of a method for cutting silicon rod according to another embodiment of the present disclosure.

In another aspect of the present disclosure, the supporting bracket 5 is an adjustment component that can move up and down, back and forth, and the spraying position of the cutting fluid is controlled by adjusting the angle of the adjustment component, to ensure the supply position of cutting fluid is 10-20 mm away from the periphery of the silicon rod. Specifically, referring to FIG. 2, the angle adjustment of the adjustment component is according to the following formula:

$$\theta = \arctan\frac{\frac{y}{2} - \sqrt{R^2 - (R - x)^2}}{Z}$$

wherein, θ is the adjusted angle, y is the distance between the two cooling pipes, the unit is mm, Z is the height between the cooling pipe and the spool motor, the unit is mm, R is the radius of the silicon rod, the unit is mm, x is the cutting depth of the diamond wire, the unit is mm. It should be noted that the "cutting depth of the diamond wire" herein can be understood as the depth at which the diamond wire 2 enters the silicon rod 3 along the cutting direction.

Figure 3:
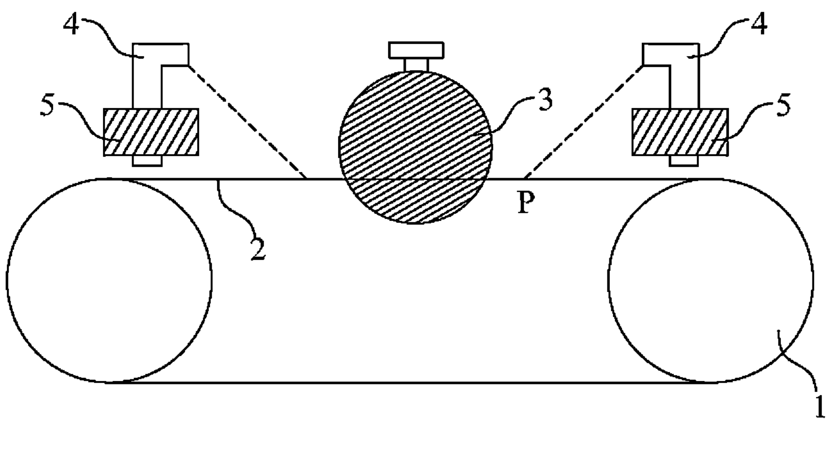
FIG. 3 is a process structure diagram of a method for cutting a silicon rod according to another embodiment of the present disclosure.

It should be noted that, referring to FIG. 3, "the supply position of cutting fluid" P herein can be understood as the position where the cutting fluid sprayed from the cooling pipe 4 contacts the diamond wire 2.

Further, the cutting fluid in the cooling pipe can be supplied to the diamond wire by spraying and/or flow guiding process.

Figure 4:
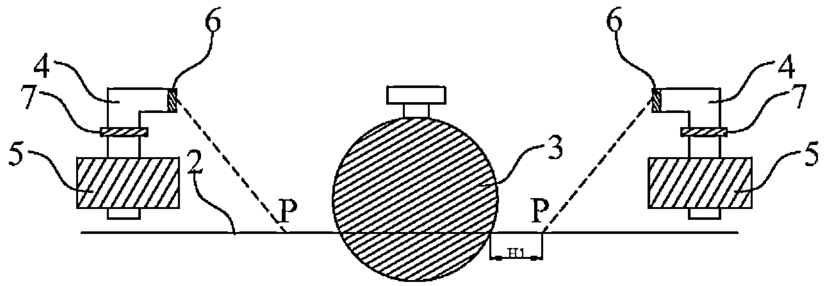
FIG. 4 is a process structure diagram of a method for cutting a silicon rod according to another embodiment of the present disclosure.

For example, referring to FIG. 4, the spraying method is to install nozzles 6 on the two cooling pipes 4, the inventor found that during the spraying process, the greater the flow of cutting fluid, the stronger the impact force and the farther the spraying position is, therefore, the supply position of the cutting fluid can be 10-20 mm away from the periphery of the silicon rod by adjusting the flow of cutting fluid. Specifically, referring to FIG. 4, through setting flow regulating valves 7 on the two cooling pipes 4 during the cutting process, when the cutting depth of the diamond wire is less than ¼ diameter of the silicon rod, preferably less than ⅛ diameter of the silicon rod, adjust the flow of cutting fluid through the flow control valve 7 to 25~30 L/min, such as 25 L/min, 26 L/min, 27 L/min, 28 L/min, 29 L/min and 30 L/min, to achieve the distance H1 from cutting fluid position p to the periphery of the silicon rod is 10-20 mm; when the cutting depth of the diamond wire is between ¼ to ¾ diameter of the silicon rod, preferably between ⅛-⅞ diameter of the silicon rod, adjust the flow of cutting fluid through the flow control valve 7 to 20-25 L/min, such as 20 L/min, 21 L/min, 22 L/min, 23 L/min, 24 L/min and 25 L/min, to achieve the distance H1 from cutting fluid position p to the periphery of the silicon rod is 10-20 mm; when the cutting depth of the diamond wire is more than ¾ diameter of the silicon rod, preferably more than ⅞ diameter of the silicon rod, adjust the flow of cutting fluid through the flow control valve 7 to 25-30 L min, such as 25 L/min, 26 L/min, 27 L/min, 28 L/min, 29 L/min and 30 L/min, to achieve the distance H1 from cutting fluid position p to the periphery of the silicon rod is 10-20 mm; effectively avoiding the side-to-side swing of the diamond wire during cutting caused by the formation of cutting fluid accumulation between the diamond wire and the silicon rod, thereby reducing the TTV or warp and improving the quality of the as-cut silicon wafer.

Figure 5:
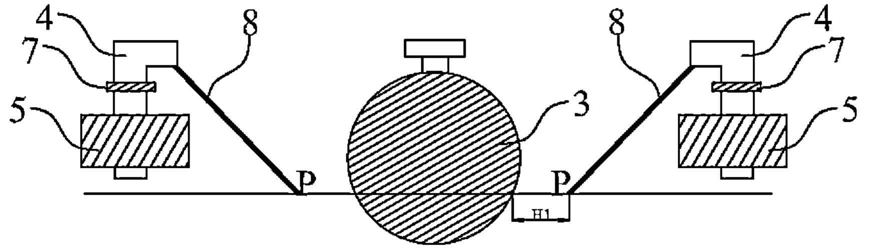
FIG. 5 is a process structure diagram of a method for cutting a silicon rod according to another embodiment of the present disclosure.

For example, referring to FIG. 5, the flow guiding method is to set guide plate 8 at the outlet of the two cooling pipes 4, one end of the guide plate 8 is connected to the outlet of the cooling pipe 4, and the other end of the guide plate 8 is set at the supply position P of the cutting fluid, for the same reason, during the flow guiding process, the greater the flow of cutting fluid, the stronger the impact force and the farther the spraying position is, therefore, the supply position of the cutting fluid can be 10-20 mm away from the periphery of the silicon rod by adjusting the flow of cutting fluid. Specifically, referring to FIG. 5, through setting flow regulating valves 7 on the two cooling pipes 4 during the cutting process, when the cutting depth of the diamond wire is less than ¼ diameter of the silicon rod, preferably less than ⅛ diameter of the silicon rod, adjust the flow of cutting fluid through the flow control valve 7 to 100~120 L/min, such as 100 L/min, 101 L/min, 102 L/min, 103 L/min, 104 L/min, 105 L/min, 106 L/min, 107 L/min, 108 L/min, 109 L/min, 110 L/min, 111 L/min, 112 L/min, 113 L/min, 114 L/min, 115 L/min, 116 L/min, 117 L/min, 118 L/min, 119 L/min and 120 L/min, to achieve the distance H1 from cutting fluid position p to the periphery of the silicon rod is 10-20 mm; when the cutting depth of the diamond wire is between ¼ to ¾ diameter of the silicon rod, preferably between ⅛-⅞ diameter of the silicon rod, adjust the flow of cutting fluid through the flow control valve 7 to 50~70 L/min, such as 50 L/min, 51 L/min, 52 L/min, 53 L/min, 54 L/min, 55 L/min, 56 L/min, 57 L/min, 58 L/min, 59 L/min, 60 L/min, 61 L/min, 62 L/min, 63 L/min, 64 L/min, 65 L/min, 66 L/min, 67 L/min, 68 L/min, 69 L/min and 70 L/min, to achieve the distance H1 from cutting fluid position p to the periphery of the silicon rod is 10-20 min; when the cutting depth of the diamond wire is more than ¾ diameter of the silicon rod, preferably more than ⅞ diameter of the silicon rod, adjust the flow of cutting fluid through the flow control valve 7 to 100~120 L/min, such as 100 L/min, 101 L/min, 102 L/min, 103 L/min, 104 L/min, 105 L/min, 106 L/min, 107 L/min, 108 L/min, 109 L/min, 110 L/min, 111 L/min, 112 L/min, 113 L/min, 114 L/min, 115 L/min, 116 L/min, 117 L/min, 118 L/min, 119 L/min and 120 L/min, to achieve the distance H1 from cutting fluid position p to the periphery of the silicon rod is 10-20 mm; effectively avoiding the side-to-side swing of the diamond wire during cutting caused by the formation of cutting fluid accumulation between the diamond wire and the silicon rod, thereby reducing the TTV or warp and improving the quality of the as-cut silicon wafer.

Further, the above-mentioned cutting fluid is water. The inventor found that the water is used as cutting fluid and cooling fluid, and isn't recycled after cutting, that is, fresh water is always supplied as cutting fluid and cooling fluid, on the one hand, it can ensure that the cutting fluid has a stable temperature and cleanliness, which effectively avoids the current recycle use of cutting fluid to increase the concentration of cutting fluid and reduce the cutting efficiency of silicon rods, and there is no need to clean the cutting chamber of the machine for each silicon rod cut, meanwhile effectively improves the problem of residual silicon powder adhering to the hardware due to the recycling of cutting fluid, thereby improving the problem of affecting the stability of the hardware, and extends the service life of the equipment, on the another hand, there is no need to add circulating cooling auxiliary fluid to cool the filtered cutting fluid, reducing processing cost, on the another hand, the components of the cutting fluid after direct discharge are silicon powder, diamond and water, which greatly simplifies the factory wastewater treatment process.

Figure 6:
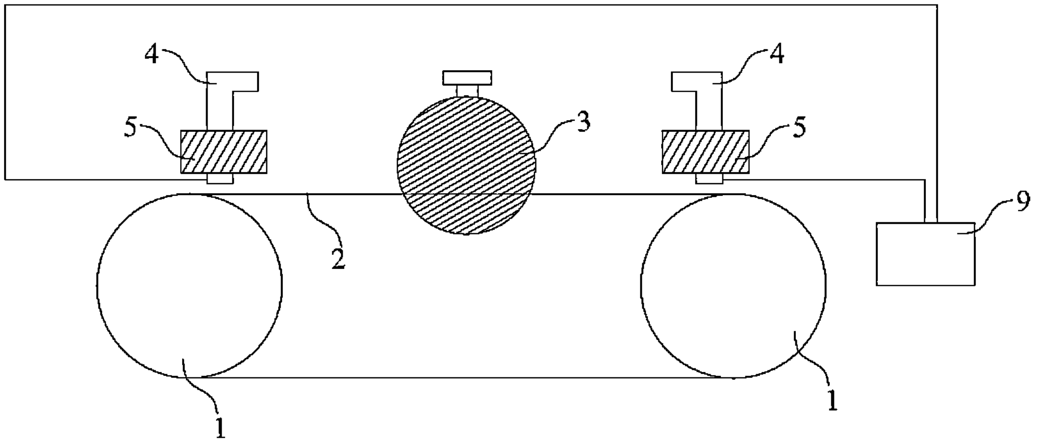
FIG. 6 is a process structure diagram of a method for cutting a silicon rod according to another embodiment of the present disclosure.

Further, referring to FIG. 6, the automatic water supplement device 9 can be used to supply water to the diamond wire 2 through two cooling pipes 4. Specifically, the water inlet of the cooling pipe 4 is connected to the automatic water supplement device 9, and the automatic water supplement device 9 is equipped with a liquid level sensor or a floating ball valve group to real-time detect the liquid level in the automatic water supplement device 9 and supplement the water in the automatic water replenishment device 9 in time to ensure the continuous supply of water in the cooling pipe 4.

According to another embodiment of the present disclosure, the present disclosure a method for cutting silicon rod includes: adjusting the new wire running amount and/or feed speed at different positions of the crystal cross section during the cutting process. And therefore to maintain the same cutting ability during the cutting process, ensure the stability of the cutting, improve the processing performance, and especially reduce the TTV value of the silicon wafer.

This step is described in detail below.

According to specific embodiments of the present disclosure, when adjusting the new wire running amount and/or the feed speed at different positions of the crystal cross section, this method is a slurry cutting method or a diamond wire cutting method.

First, the method for slurry cutting method is described in detail below.

According to some embodiments of the present disclosure, when using the slurry cutting method, adjust the cutting feed speed during the cutting process, wherein:

during the cutting process, the loop running amount is set to 500~800 m/min, the new wire running amount is 850~950 m/min, and the difference between the new wire running amount and the loop running amount is greater than 5% of the loop running amount, and the feed speed is set according to formula 1:

$$Vx = \frac{R}{\sqrt{R^2 - (R-x)^2}} Vc \quad \text{(Formula 1)}$$

Vx is the feed speed at the cutting position x,

R is the radius of the silicon rod, x is the feed length along the cutting direction, Vc is the feed speed at the cutting position x=R, Vc=0.6~1.2 mm/min.

Therefore, the inventor found that when using the slurry cutting method, during the cutting process, the cutting feed speed is adjusted according to formula 1 to ensure that the steel wire receives uniform force at all steps of the cutting area and has the same cutting ability which improves the stability of cutting and reduces the TTV of the silicon wafer.

According to some embodiments of the present disclosure, when using the slurry cutting method, the new wire running amount is adjusted during the cutting process, wherein:

before starting the cutting process, the loop running amount is set to 500~800 m/min, the feed speed Vc=0.6~1.2 mm/min;

after the cutting process is started, the loop running amount and the feed speed remain unchanged, the new wire running amount is adjusted according to formula 2:

$$Wx = \frac{\sqrt{R^2 - (R-x)^2}}{R^2} Wc \quad \text{(Formula 2)}$$

Wx is the new wire running amount at the cutting position x,

R is the radius of the silicon rod, x is the feed length along the cutting direction, We is the new wire running amount at the cutting position, Wc=850~950 m/min.

where, when Wx<loop running amount*1.05, Wx=loop running amount*1.05.

Therefore, the inventor found that when using the slurry cutting method, the new wire running amount is adjust according to formula 2 during the cutting process to ensure that the steel wire receives uniform force at all steps of the cutting area and has the same cutting ability which improves the stability of cutting and reduce the TTV of the silicon wafer.

According to specific embodiments of the present disclosure, in the above-mentioned slurry cutting method, the cutting fluid is water or water-based.

Figure 7:
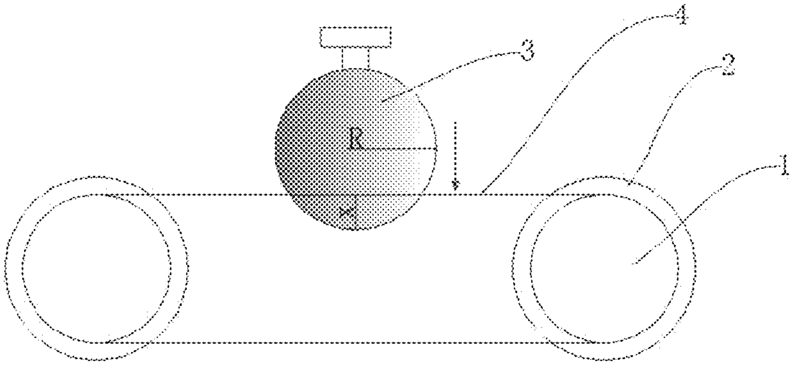
FIG. 7 is a schematic diagram of the cutting direction in the method for cutting silicon rod with a diamond multi-wire according to an embodiment of the present disclosure, 1—main shaft, 2—main wheel, 3—silicon rod 4—steel wire or diamond wire, x-feed length along the cutting direction, R— Radius of silicon rod.

Secondly, the method for diamond wire is described in detail below. The schematic diagram of the cutting direction in the method of diamond multi-wire cutting of silicon rods is shown in FIG. 7, 1—main shaft, 2—main wheel, 3—silicon rod 4—steel wire or diamond wire, x is the feed length in the cutting direction, R is the radius of silicon rod. The main shaft 1 in FIG. 7 is the spool motor 1 in FIG. 1 above.

According to some embodiments of the present disclosure, when using the diamond wire cutting method, the new wire running amount is adjusted during the cutting process. According to the specific embodiment of the present disclosure, the adjustment of the new wire running amount can be specifically performed according to the following steps:

before starting the cutting process, the loop running amount is set to 500~800 m/min, the first new wire running amount is 850~950 m/min, the feed speed is 0.6~1.2 mm/min;

after the cutting process is started, the loop running amount and the feed speed remain unchanged, the first new wire running amount is adjusted to the second new wire running amount, and the second new wire running amount is adjusted according to formula 3:

$$\text{The second new wire running amount} = \frac{R}{\sqrt{R^2-(R-x)^2}} \times \text{The first new wire running amount,} \quad \text{(formula 3)}$$

R is the radius of the silicon rod, x is the feed length along the cutting direction.

Therefore, the new wire running amount is continuously adjusted according to formula 3 to ensure that the steel wire receives uniform force at all steps of the cutting area and has the same cutting ability, which improve the stability of cutting and reduce the TTV of the silicon wafer.

According to a specific embodiment of the present disclosure, the above-mentioned feed speed is preferably 0.6 mm/min. Therefore, at this feed speed, the stability of cutting can be further improved by constantly adjusting the new wire running amount According to some embodiments of the present disclosure, only the feed speed is adjusted during the cutting process of the silicon rod. According to the specific embodiment of the present disclosure, the adjustment of the feed speed can be specifically performed according to the following steps:

during the cutting process, the loop running amount is set to 500~800 m/min, the new wire running amount is 850~950 m/min, the feed speed is set according to formula 4:

$$Vx = \frac{R}{\sqrt{R^2-(R-x)^2}} Vc \quad \text{(Formula 4)}$$

Vx is the feed speed at the cutting position x,

R is the radius of the silicon rod, x is the feed length along the cutting direction (as shown in FIG. 7), Vc is the feed speed at the cutting position x=R, Vc=0.6~1.2 mm/min According to another embodiment of the present disclosure, during the cutting process, the new wire running amount and feed speed are adjusted.

Specifically, before starting the cutting process, the loop running amount is set to 500~800 m/min, the first new wire running amount is 850~950 m/min, after the cutting process is started, the loop running amount and the feed speed remain unchanged, the first new wire running amount is adjusted to the second new wire running amount, and the second new wire running amount is adjusted according to formula 3, and the feed speed is set according to formula 4.

$$\text{The second new wire running amount} = \frac{R}{\sqrt{R^2-(R-x)^2}} \times \text{The first new wire running amount,} \quad \text{Formula 3}$$

$R$ is the radius of the silicon rod, $x$ is the feed length along the cutting direction.

$$Vx = \frac{R}{\sqrt{R^2-(R-x)^2}} Vc, \quad \text{Formula 4}$$

Vx is the feed speed at the cutting position x, R is the radius of the silicon rod, x is the feed length along the cutting direction, Vc is the feed speed at the cutting position x=R, Vc=0.6~1.2 mm/min Therefore, to ensure that the steel wire receives uniform force at all steps of the cutting area and has the same cutting ability, which ensures the stability of cutting and improves the TTV quality of the silicon wafer.

According to the specific embodiment of the present disclosure, the inventors further found that in the two steps of 0-15% and 85-100% cutting feed length of the diameter of the silicon rod, the increase rate of the unit cutting area is relatively large, and need to ensure uniform force at all steps of the cutting area. The inventor found that, the cutting feed position was designed separately in the two steps of 0-15% and 85-100% of the diameter of the silicon rod, and the new line running amount and feed speed in the stage of 15-85%, which can ensure uniform force at all steps of the cutting area. Specifically, during the cutting process, the new wire running amount is adjusted when the cutting feed position is 0-15% and 85-100% of the diameter of the silicon rod, and/or the cutting feed speed is adjusted when the cutting feed position is 15-85% of the diameter of the silicon rod.

Wherein, according to an embodiment of the present disclosure, the new wire running amount is adjusted when the cutting feed position is 0-15% and 85-100% of the diameter of the silicon rod. According to specific embodiment of the present disclosure, the adjustment of the new wire running amount can be specifically performed method described in the previous embodiment, namely:

before starting the cutting process, the loop running amount is set to 500~800 m/min, the first new wire running amount is 850~950 m/min, the feed speed is 0.6~1.2 mm/min;

after the cutting process is started, the loop running amount and the feed speed remain unchanged, the first new wire running amount is adjusted to the second new wire running amount when the cutting feed position is 0-15% and 85-100% of the diameter of the silicon rod, and the new wire running amount is adjusted to the predefined first new wire running amount when the cutting feed position is 15%-85% of the diameter of the silicon rod. Specifically, the second new wire running amount is adjusted according to formula 3:

$$\text{The second new wire running amount} = \frac{R}{\sqrt{R^2-(R-x)^2}} \times \text{The first new wire running amount,} \quad \text{(formula 3)}$$

$R$ is the radius of the silicon rod, $x$ is the feed length along the cutting direction.

According to an embodiment of the present disclosure, the feed speed is adjusted when the cutting feed position is 15%-85% of the diameter of the silicon rod. And the feed speed is adjusted to predefined 0.6~1.2 mm/min when the cutting feed position is 0-15% and 85-100% of the diameter of the silicon rod. According to specific embodiment of the present disclosure, the adjustment of the feed speed can be specifically performed according to the method described in the previous embodiment, namely:

during the cutting process, the loop running amount is set to 500~800 m/min, the new wire running amount is 850~950 m/min, the feed speed is set according to formula 4:

$$Vx = \frac{R}{\sqrt{R^2 - (R-x)^2}} Vc \quad \text{(Formula 4)}$$

Vx is the feed speed at the cutting position x, R is the radius of the silicon rod, x is the feed length along the cutting direction, Vc is the feed speed at the cutting position x=R, Vc=0.6~1.2 mm/min.

According to another embodiment of the present disclosure, in the process of cuffing the silicon rod, the new line running amount and feed speed are controlled by the cutting position. Specifically, when the cutting feed position is 0-15% and 85-100% of the diameter of the silicon rod, the new line running amount is adjusted; and when the cutting feed position is 15-85% of the diameter of the silicon rod, the cutting feed speed is adjusted.

According to the specific embodiment of the present disclosure, when the cutting feed position is 0-15% and 85-100% of the diameter of the silicon rod, the loop running amount is 500~800 m/min, the feed speed is 0.6~1.2 mm/min, the first new wire running amount is 850~950 m/min, and the first new wire running amount is continuously adjusted to the second new wire running amount according to above formula 3. When the cutting feed position is 15%-85% of the diameter of the silicon rod, the loop running amount is 500~800 m/min, the new wire running amount is 850~950 m/min, and the feed speed is continuously adjusted according to the above formula 4.

According to the specific embodiment of the present disclosure, the cutting feed speed or the new wire running amount is adjusted in at least 45 steps during the cutting process. When the cutting feed position is 15%-85% of the diameter of the silicon rod during the cutting process, the cutting feed speed or the new wire running amount is adjusted in at least 45 steps, which ensured that the steel wire receives uniform force at all steps of the cutting area, and improves the TTV quality of the silicon wafer.

According to the specific embodiment of the present disclosure, during the above-mentioned cutting process the tension of the steel wire is stabilized in the range of 20-35 N, and the linear speed of the cutting process is 700-1500 m/min.

Figure 10:
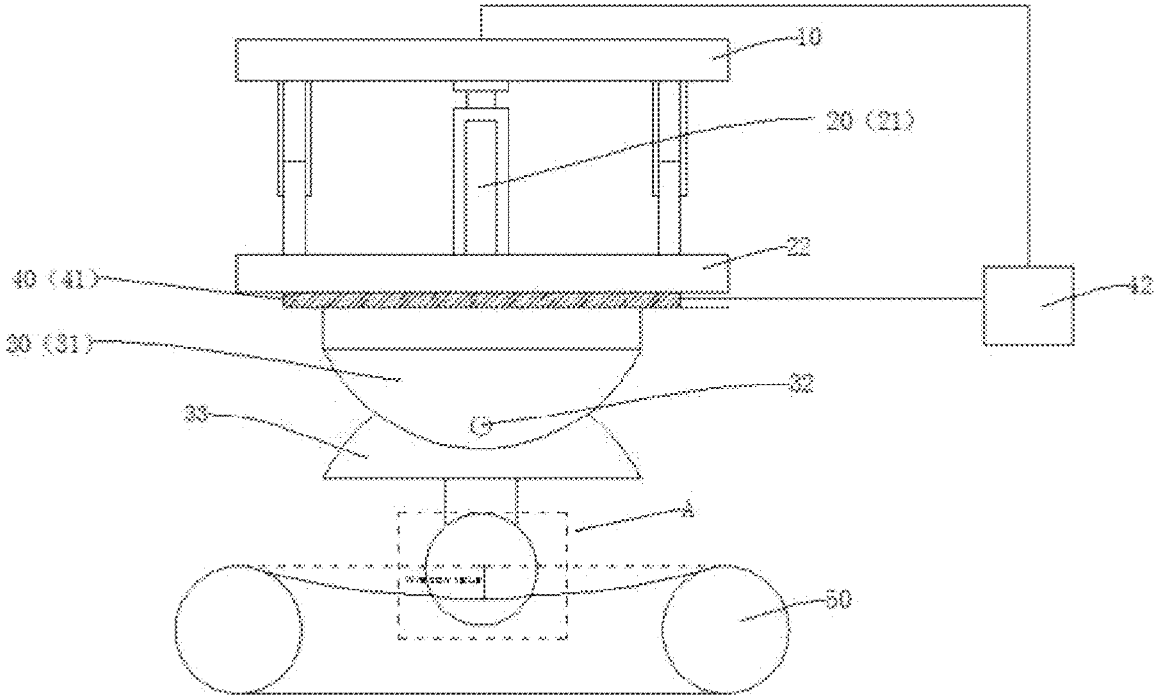
FIG. 10 is a schematic structural diagram of an apparatus of diamond multi-wire cutting according to an embodiment of the present disclosure.

According to another aspect of the present disclosure, the present disclosure also provides an apparatus for diamond multi-wire cutting. According to an embodiment of the present disclosure, as shown in FIG. 10, the apparatus for diamond multi-wire cutting includes: fixed plate 10, lifting mechanism 20, swing mechanism 30 and pressure detection mechanism 40.

The lifting mechanism 20 includes lifting cylinder 21 and lifting platform 22, the lifting cylinder 21 is arranged on the lifting platform 22 and connected to the bottom wall of the fixed plate 10.

The swing mechanism 30 includes fixed part 31, shaft pin 32, and rotating part 33, the fixed part 31 and the rotating part 33 are relatively rotatable connected by the shaft pin 32, the fixed part 31 is connected to the bottom wall of the lifting platform 22, and the bottom wall of the rotating part 33 is suitable for installing the silicon rod to be cut.

The pressure detection mechanism 40 includes a pressure sensing device 41 which is arranged between the swing mechanism 30 and the lifting mechanism 20, and the pressure sensing device 41 collects the perceived stress of the wire bow for swing mechanism 30 during operation.

Therefore, the apparatus for diamond multi-wire cutting of the above-mentioned embodiment of the present disclosure has the swing mechanism, which can relatively swing with different cutting positions, reducing the effect of the change in the force area on the wire bow from the starting position to the final position during the cutting process, and thus effectively improving the warp. Meanwhile, the apparatus for diamond multi-wire cutting in the above embodiment has the pressure detection mechanism, which can sense the pressure of the wire bow through the contact between the swing mechanism and the wire bow, and provide a reference for stable control of the wire bow. Therefore, the apparatus for diamond multi-wire cutting according to the embodiment of the present disclosure can maintain the stability of the wire bow, increase the yield, and improve the warp, TTV and nanotopography.

The present disclosure is based on the inventor found that the stability of the wire bow can be characterized by the pressure between the diamond wire and the silicon rod, that is, if the pressure between the diamond wire and the silicon rod is stable, the value of wire bow also tends to be stable. Therefore, the stability of the wire can be indirectly obtained by monitoring the pressure between the diamond wire and the silicon rod, furthermore, the wire bow can be kept stable by adjusting the process, which can increase the cutting yield of the silicon rod, improve the warp, TTV and nanotopography.

In order to more accurately monitor the pressure between the diamond wire and the silicon rod and perform pressure compensation, according to an embodiment of the present disclosure, the above-mentioned pressure detection mechanism 40 includes control processing device 42, the control processing device 42 is connected with the pressure sensing device 41, the control processing device 42 is connected with the lifting mechanism 20 and/or the swing mechanism 30, the control processing device 42 analyzes and processes the pressure value fed back by the pressure sensing device 41, and further the pressure is automatically compensated by adjusting the lifting mechanism 20 or/and the swing mechanism 30.

Specifically, after the pressure value is collected by the pressure sensing device 41, the pressure value is fed back to the control device 42 to perform analysis and processing, if the pressure value of wire bow is found to be too large or too small, the control processing device 42 transmits the command signal to the lifting mechanism 20, which automatically compensates the pressure of the wire bow by adjusting the lifting of the lifting cylinder 21; or the control processing device 42 transmits the command signal to the swing mechanism 30, which automatically compensates the pressure of the wire bow by adjusting the rotation angle of the swing rotating part 33; or the control processing device 42 transmits the command signal to the lifting mechanism 20 and the swing mechanism 30 at the same time, the lifting mechanism 20 adjusts the lifting of the lifting cylinder 21, and the swing mechanism 30 adjusts the rotation angle of the swing rotating part 33 to simultaneously realize the pressure compensation for the wire bow. If the value of wire bow is stable, the pressure of the silicon rod on the reel 50 is stable, the stable value of wire bow can reduce the damage of the groove of the reel 50 and increase the lifetime of the reel 50. The reel 50 in FIG. 10 is the spool motor 1 in FIG. 1 above. The above-mentioned automatic pressure compensation function can greatly improve the cutting efficiency without affecting the warp, and can increase the stability of the cutting quality.

Figure 12:
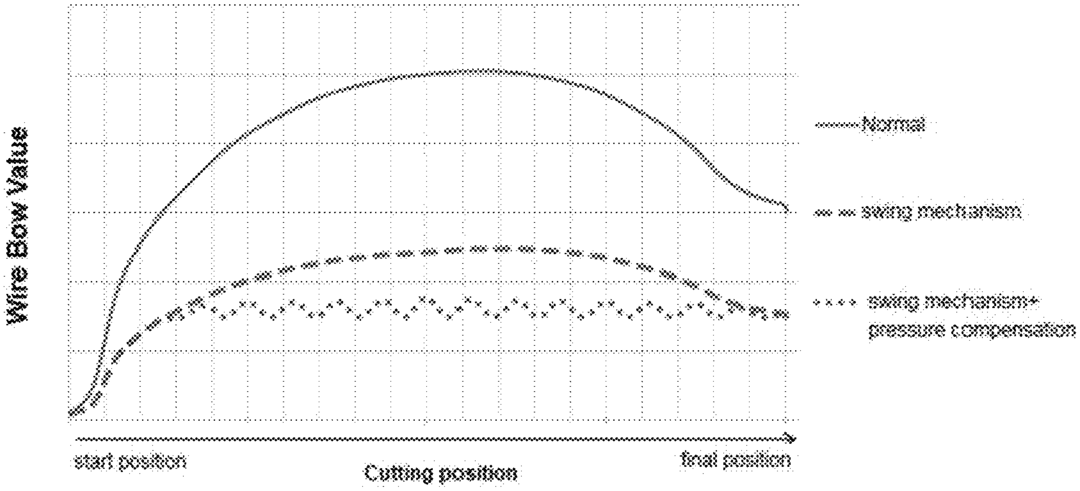
FIG. 12 is a diagram of the relationship between the value of wire bow and the cutting position according to an embodiment of the present disclosure.

According to the specific embodiment of the present disclosure, the stable value of the wire bow is 1-3 mm. Therefore, with the standard value of wire bow as a reference, the calculated actual value of wire bow is adjusted to be within the stable range, which can significantly increase the yield of silicon rod cutting, improve warp, TTV and nanotopography. For example, as shown in FIG. 12, the value of wire bow is always stable under different cutting positions and different cutting areas by adding and setting swing mechanism and pressure detection device.

Figure 11:
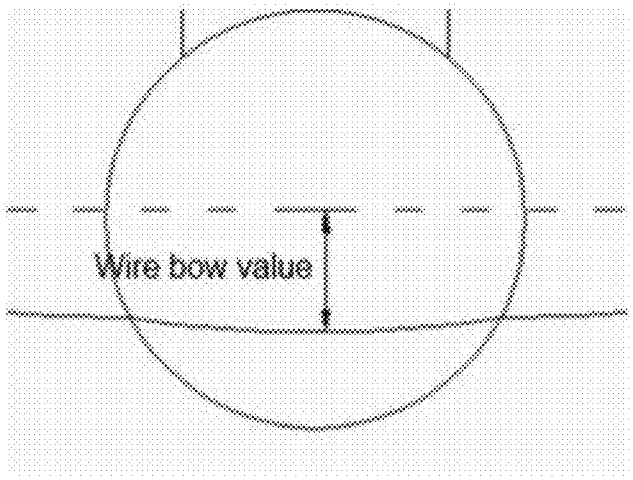
FIG. 11 is an enlarged effect view of the area A of FIG. 10.

It should be noted that, referring to FIG. 10-11, "the value of wire bow" in this disclosure is the distance between the lowest point of the diamond wire and the highest point of the reel.

According to another aspect of the present disclosure, the present disclosure also proposes a method for cutting silicon rods using the apparatus of diamond multi-wire cutting described in the previous embodiment, In this method, the swing angle $$\theta_x = \frac{\sqrt{R^2 - (R-x)^2}}{R \times \theta_M},$$

where, $\theta_x$ is the angle at the cutting position x, $\theta_M$ is the angle at the maximum cutting position, R is the radius of the silicon rod, and x is the cutting length along the feed direction.

Therefore, the apparatus of the above-mentioned diamond multi-wire cutting is used to cut the silicon rod, by controlling the swing angle of the swing device, the swing angle of the swing device is adjusted with the change of the cutting position, to reduce the force change from the start position to the final position, which effectively improve the condition of the wire bow, that directly affects the result of the warp. Therefore, using the above formula to control the swing angle can effectively improve the warp and nanotopography, and reduce TTV.

Figure 13:
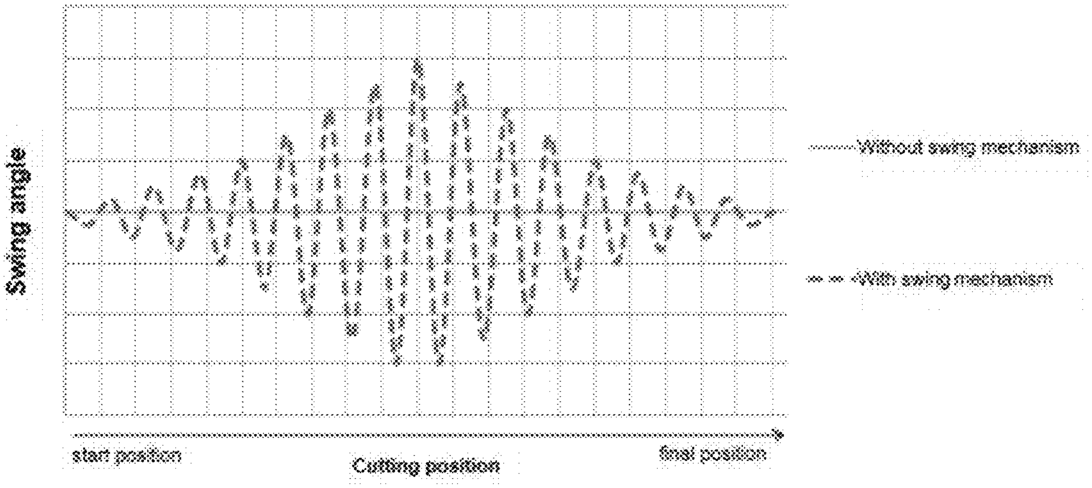
FIG. 13 is a diagram of the relationship between the swing angle and the cutting position according to an embodiment of the present disclosure.
Figure 14:
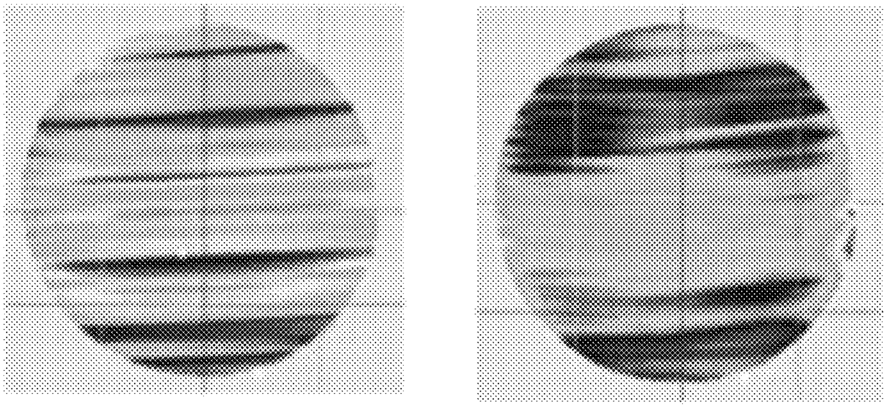
FIG. 14 is a nanotopography diagram of the surface of a wafer after cutting according to an embodiment of the present disclosure.
Figure 15:
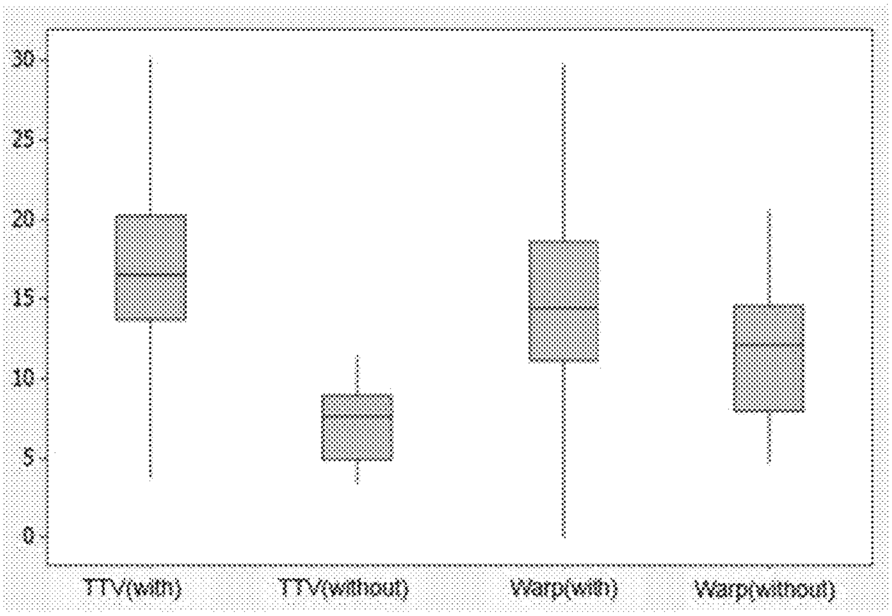
FIG. 15 is TTV and warp value of a wafer according to an embodiment of the present disclosure.

In addition, in the above-mentioned cutting method of the present disclosure, as shown in FIG. 13, when the cutting area increases, the swing angle becomes larger, and thereby increasing the stability of the cutting. For example, as shown in FIG. 14, the thickness change of the wafer cut from the silicon rod were measured, compared with normal wafer, the color of the wafer with the swing device and pressure detection device is darker (more uniform), the color fluctuation is smaller and the thickness morphology is more uniform. As shown in FIG. 15, the TTV value and warp value of the wafer cut from the silicon rod were measured, compared with normal, the TTV and warp of the wafer with swing device and pressure detection device decreased. (TTV test method: GB/T29507-2013 Test method for measuring flatness, thickness and total thickness variation on silicon wafers-Automated non-contact scanning; Warp test method: GB/T32280-2015 Test method for warp of silicon wafers—Automated non-contact scanning).

According to specific embodiment of the present disclosure, the swing angle of the rotating part at the maximum cutting area in the above formula is 0-12 degrees, preferably 6-12 degrees.

Therefore, the apparatus of diamond multi-wire cutting and the cutting method of the above embodiments of the present disclosure have at least one of the following advantages:

(1) Reduce the main factors of unstable slurry cutting ability during multi-wire cutting, and reduce yield loss during production.

(2) Improve the wavy TTV problem caused by the difference cutting ability before wire feeding and wire return due to the small wire amount used in diamond multi-wire cutting, and also improve the nanotopography.

(3) The function of pressure automatic compensation can greatly improve the cutting efficiency without affecting the warp, and can increase the stability of the cutting quality. On the other hand, the stable wire bow means that the reel bears stable pressure from the diamond, which can reduce the damage to the groove of the reel and increase the lifetime of the reel.

The present disclosure is described below with reference to the specific embodiments, it is to be noted that these embodiments are only descriptive and do not limit the present disclosure in any modes.

Embodiment 1

(1) Fix the silicon rod to be cut on the machine table;

(2) The two cooling pipes are sprayed to supply cutting fluid to the diamond wire, and the diamond wire is used to cut the silicon rod. When the cutting depth of the diamond wire is less than ¼ diameter of the silicon rod, the flow rate of the cutting fluid is adjusted to 25 L/min through the flow regulating valve, so that the distance H1 is 16 mm from the supply position of the cutting fluid to the periphery of the silicon rod; when the cutting depth of the diamond wire is between ¼-¾ diameter of the silicon rod, the flow rate of the cutting fluid is adjusted to 20 L/min through the flow regulating valve, so that the distance H1 is 16 mm from the supply position of the cutting fluid to the periphery of the silicon rod; and when the cutting depth of the diamond wire is more than ¾ diameter of the silicon rod, the flow rate of the cutting fluid is adjusted to 25 L/min through the flow regulating valve, so that the distance H1 is 16 mm from the supply position of the cutting fluid to the periphery of the silicon rod, meanwhile, the tension of the diamond wire is maintained at 23 N during the cutting process, the linear speed of spool motor maintains is 700 m/min, and cutting speed is 0.6 mm/min.

Embodiment 2

(1) Fix the silicon rod to be cut on the machine table;

(2) The two cooling pipes are sprayed to supply cutting fluid to the diamond wire, and the diamond wire is used to cut the silicon rod. When the cutting depth of the diamond wire is less than ⅛ diameter of the silicon rod, the flow rate of the cutting fluid is adjusted to 28 L/min through the flow regulating valve, so that the distance H1 is 16 mm from the supply position of the cutting fluid to the periphery of the silicon rod; when the cutting depth of the diamond wire is between ⅛~⅞ diameter of the silicon rod, the flow rate of the cutting fluid is adjusted to 25 L/min through the flow regulating valve, so that the distance H1 is 18 mm from the supply position of the cutting fluid to the periphery of the silicon rod; and when the cutting depth of the diamond wire is more than ⅞ diameter of the silicon rod, the flow rate of the cutting fluid is adjusted to 28 L/min through the flow regulating valve, so that the distance H1 is 16 mm from the supply position of the cutting fluid to the periphery of the silicon rod, meanwhile, the tension of the diamond wire is maintained at 24 N during the cutting process, the linear speed of spool motor maintains is 800 m/min, and cutting speed is 0.8 mm/min.

Embodiment 3

(1) Fix the silicon rod to be cut on the machine table;

(2) The two cooling pipes are sprayed to supply cutting fluid to the diamond wire, and the diamond wire is used to cut the silicon rod. When the cutting depth of the diamond wire is less than 3⁄16 diameter of the silicon rod, the flow rate of the cutting fluid is adjusted to 29 L/min through the flow regulating valve, so that the distance H1 is 17 mm from the supply position of the cutting fluid to the periphery of the silicon rod; when the cutting depth of the diamond wire is between 3⁄16~13⁄16 diameter of the silicon rod, the flow rate of the cutting fluid is adjusted to 24 L/min through the flow regulating valve, so that the distance H1 is 17 mm from the supply position of the cutting fluid to the periphery of the silicon rod; and when the cutting depth of the diamond wire is more than 13⁄16 diameter of the silicon rod, the flow rate of the cutting fluid is adjusted to 30 L/min through the flow regulating valve, so that the distance H1 is 17 mm from the supply position of the cutting fluid to the periphery of the silicon rod, meanwhile, the tension of the diamond wire is maintained at 25 N during the cutting process, the linear speed of spool motor maintains is 1000 m/min, and cutting speed is 1.2 mm/min.

Embodiment 4

(1) Fix the silicon rod to be cut on the machine table;

(2) The two cooling pipes use the guide plate to supply the cutting fluid to the diamond wire, and the diamond wire is used to cut the silicon rod. When the cutting depth of the diamond wire is less than 1⁄8 diameter of the silicon rod, the flow rate of the cutting fluid is adjusted to 100 L/min through the flow regulating valve, so that the distance H1 is 15 mm from the supply position of the cutting fluid to the periphery of the silicon rod; when the cutting depth of the diamond wire is between 1⁄8~7⁄8 diameter of the silicon rod, the flow rate of the cutting fluid is adjusted to 50 L/min through the flow regulating valve, so that the distance H1 is 15 mm from the supply position of the cutting fluid to the periphery of the silicon rod; and when the cutting depth of the diamond wire is more than 7⁄8 diameter of the silicon rod, the flow rate of the cutting fluid is adjusted to 100 L/min through the flow regulating valve, so that the distance H1 is 15 mm from the supply position of the cutting fluid to the periphery of the silicon rod, meanwhile, the tension of the diamond wire is maintained at 24 N during the cutting process, the linear speed of spool motor maintains is 1300 m/min, and cutting speed is 0.9 mm/min.

Embodiment 5

(1) Fix the silicon rod to be cut on the machine table;

(2) The two cooling pipes use the guide plate to supply the cutting fluid to the diamond wire, and the diamond wire is used to cut the silicon rod. When the cutting depth of the diamond wire is less than 1⁄4 diameter of the silicon rod, the flow rate of the cutting fluid is adjusted to 110 L/min through the flow regulating valve, so that the distance H1 is 19 mm from the supply position of the cutting fluid to the periphery of the silicon rod; when the cutting depth of the diamond wire is between 1⁄4~3⁄4 diameter of the silicon rod, the flow rate of the cutting fluid is adjusted to 60 L/min through the flow regulating valve, so that the distance H1 is 19 mm from the supply position of the cutting fluid to the periphery of the silicon rod; and when the cutting depth of the diamond wire is more than 3⁄4 diameter of the silicon rod, the flow rate of the cutting fluid is adjusted to 110 L/min through the flow regulating valve, so that the distance H1 is 19 mm from the supply position of the cutting fluid to the periphery of the silicon rod, meanwhile, the tension of the diamond wire is maintained at 24 N during the cutting process, the linear speed of spool motor maintains is 1100 m/min, and cutting speed is 0.6 mm/min.

Embodiment 6

(1) Fix the silicon rod to be cut on the machine table;

(2) The two cooling pipes use the guide plate to supply the cutting fluid to the diamond wire, and the diamond wire is used to cut the silicon rod. When the cutting depth of the diamond wire is less than 3⁄16 diameter of the silicon rod, the flow rate of the cutting fluid is adjusted to 120 L/min through the flow regulating valve, so that the distance H1 is 19 mm from the supply position of the cutting fluid to the periphery of the silicon rod; when the cutting depth of the diamond wire is between 3⁄16~13⁄16 diameter of the silicon rod, the flow rate of the cutting fluid is adjusted to 70 L/min through the flow regulating valve, so that the distance H1 is 19 mm from the supply position of the cutting fluid to the periphery of the silicon rod; and when the cutting depth of the diamond wire is more than 13⁄16 diameter of the silicon rod, the flow rate of the cutting fluid is adjusted to 120 L/min through the flow regulating valve, so that the distance H1 is 19 mm from the supply position of the cutting fluid to the periphery of the silicon rod, meanwhile, the tension of the diamond wire is maintained at 25 N during the cutting process, the linear speed of spool motor maintains is 1 200 m/min, and cutting speed is 0.7 mm/min.

Embodiment 7

(1) Fix the silicon rod to be cut on the machine table;

(2) The nozzle is used to spray water to the diamond wire, and the diamond wire is used to cut the silicon rod, wherein the flow rate of the cutting fluid is maintained at 25 L/min. The cooling pipe is fixed by an adjustment component that can move up and down, back and forth, and the distance H1 is 15 mm from the supply position of the cutting fluid to the periphery of the silicon rod by adjusting the angle of the adjustment component. Meanwhile, the tension of the diamond wire is maintained at 24 N during the cutting process, the linear speed of spool motor maintains is 750 m/min, and cutting speed is 0.8 mm/min.

Embodiment 8

(1) Fix the silicon rod to be cut on the machine table;

(2) The guide plate is used to supply cutting fluid to the diamond wire, and the diamond wire is used to cut the silicon rod, wherein the flow rate of the cutting fluid is maintained at 70 L/min. The cooling pipe is fixed by an adjustment component that can move up and down, back and forth, and the distance H1 is 18 mm from the supply position of the cutting fluid to the periphery of the silicon rod by adjusting the angle of the adjustment component. Meanwhile, the tension of the diamond wire is maintained at 25 N during the cutting process, the linear speed of spool motor maintains is 850 m/min, and cutting speed is 1.0 mm/min.
Comparative embodiment 1

(1) Fix the silicon rod to be cut on the machine table;

(2) The cutting fluid Synergy DWS 260 is supplied to the diamond wire by spraying, and the diamond wire is used to cut the silicon rod, wherein the flow rate of the cutting fluid is maintained at 25 L/min. Meanwhile, the tension of the diamond wire is maintained at 24 N during the cutting process, the linear speed of spool motor maintains is 1000 m/min, and cutting speed is 1.0 mm/min.

Evaluation:

1. Measure TTV (the difference between the maximum and the minimum thickness value of the silicon wafer surface relative to the ideal reference plane of the back surface for silicon wafer) and the warp (the change range of the highest point and the lowest point of the middle surface of the silicon wafer opposite to the reference surface of the back) and the warp (the difference between the maximum and minimum distance of the median surface of the wafer from a back reference plane) for the wafer obtained by the method of embodiment 1-8

2. Measurement:

TTV test method: GB/T29507-2013 Test method for measuring flatness, thickness and total thickness variation on silicon wafers-Automated non-contact scanning;

Warp test method: GB/T32280-2015 Test method for warp of silicon wafers-Automated non-contact scanning The test results are shown in Table 1.

TABLE 1

TTV and warp of wafers obtained by the method of embodiment 1-8 and comparative embodiment 1

| | TTV (μm) | 翘曲度 Warp (μm) |
|---|---|---|
| Embodiment 1 | 8~13 | 9~15 |
| Embodiment 2 | 10~14 | 10~15 |
| Embodiment 3 | 9~15 | 11~16 |
| Embodiment 4 | 10~16 | 10~17 |
| Embodiment 5 | 11~17 | 10~18 |
| Embodiment 6 | 13~20 | 11~17 |
| Embodiment 7 | 8~11 | 9~17 |
| Embodiment 8 | 12~19 | 11~18 |
| Comparative Embodiment 1 | 10~57 | 11~45 |

Embodiment 9

(1) Using the slurry to cut silicon rod and adjust the cutting feed speed during the cutting process, wherein:

During the cutting process, the loop running amount is set to 500 m/min, the new wire running amount is 850 m/min, and the difference between the new wire running amount and the loop running amount is greater than 5% of the loop running amount, and the feed speed is set according to formula 1:

$$Vx = \frac{R}{\sqrt{R^2 - (R-x)^2}} Vc \quad \text{(Formula 1)}$$

Vx is the feed speed at the cutting position x,

R is the radius of the silicon rod, x is the feed length along the cutting direction, Vc is the feed speed at the cutting position x=R, Vc=0.6 mm/min.

Figure 8:
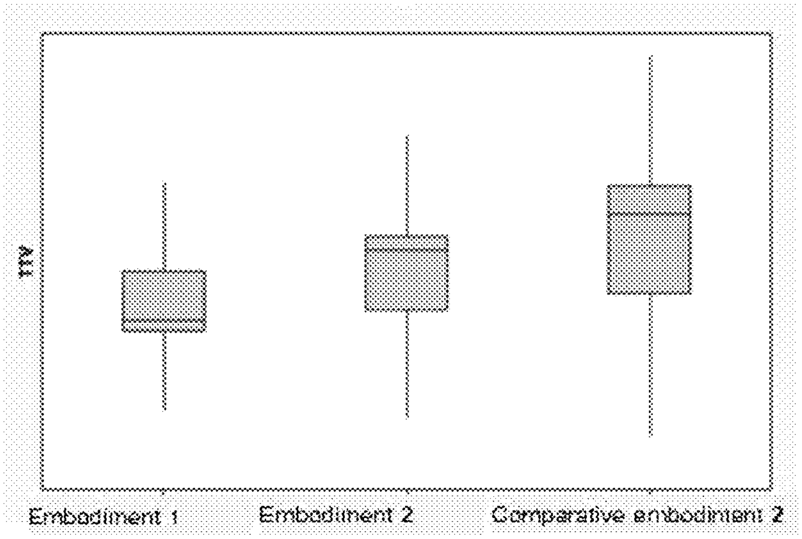
FIG. 8 is a comparison diagram of TTV values between embodiments and comparative embodiment 2.

(2) Evaluation: The TTV (total thickness deviation) is measured by using above method GB/729507-2013 Test method for measuring flatness, thickness and total thickness variation on silicon wafers-Automated non-contact scanning. The measurement result is shown in FIG. 8.

Embodiment 10

(1) Using the slurry to cut silicon rod and adjust the new wire running amount during the cutting process, wherein:

before starting the cutting process, the loop running amount is set to 600 m/min, the feed speed Vc=0.8 mm/min;

after the cutting process is started, the loop running amount and the feed speed remain unchanged, the new wire running amount is adjusted according to formula 2:

$$Wx = \frac{\sqrt{R^2 - (R-x)^2}}{R^2} Wc \quad \text{(Formula 2)}$$

Wx is the new wire running amount at the cutting position x,

R is the radius of the silicon rod, x is the feed length along the cutting direction, We is the new wire running amount at the cutting position, Wc=900 m/min.

wherein, when Wx<loop running amount×1.05, Wx=loop running amount×1.05.

(2) Evaluation: The TTV (total thickness deviation) is measured by using above method GB/T29507-2013 Test method for measuring flatness, thickness and total thickness variation on silicon wafers-Automated non-contact scanning. The measurement result is shown in FIG. 8.

Embodiment 11

(1) Using the diamond wire to cut silicon rod and adjust the new wire running amount during the cutting process, wherein:

before starting the cutting process, the loop running amount is set to 780 m/min, the first new wire running amount is 890 m/min, the feed speed is 0.9 mm/min;

after the cutting process is started, the loop running amount and the feed speed remain unchanged, the first new wire running amount is adjusted to the second new wire running amount, and the second new wire running amount is adjusted according to formula 3:

$$\text{The second new wire running amount} = \frac{R}{\sqrt{R^2 - (R-x)^2}} \times \text{The first new wire running amount,} \quad \text{(formula 3)}$$

R is the radius of the silicon rod, x is the feed length along the cutting direction.

Figure 9:
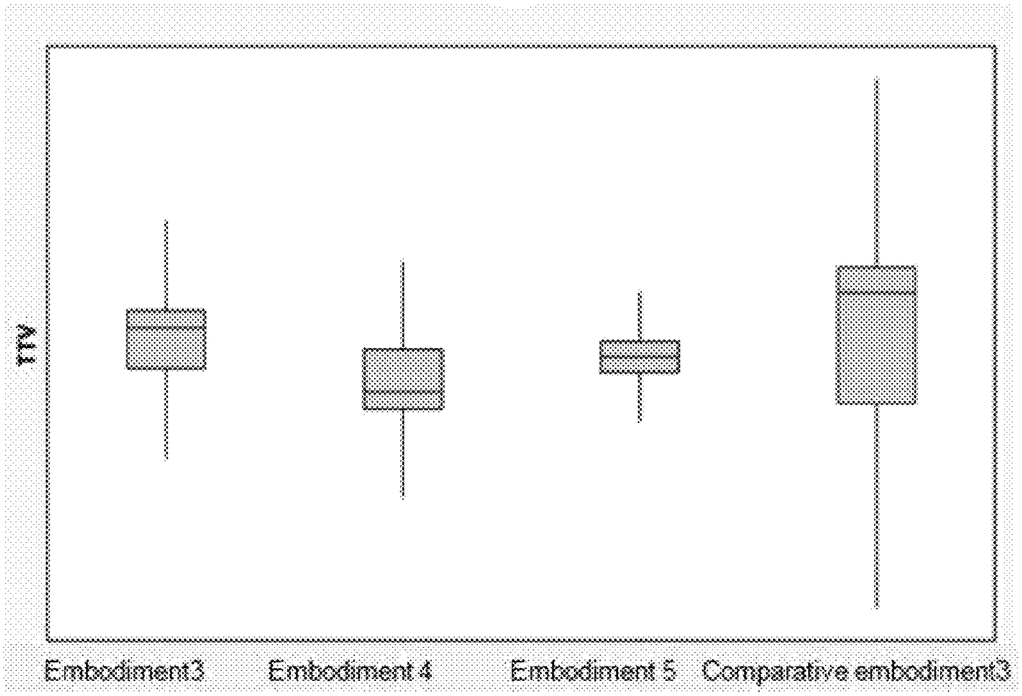
FIG. 9 is a comparison diagram of TTV values between embodiments and comparative embodiment 3.

(2) Evaluation: The TTV (total thickness deviation) is measured by using above method GB/T29507-2013 Test method for measuring flatness, thickness and total thickness variation on silicon wafers-Automated non-contact scanning. The measurement result is shown in FIG. 9.

Embodiment 12

(1) Using the diamond wire to cut silicon rod and adjust the feed speed during the cutting process, wherein:

during the cutting process, the loop running amount is set to 650 m/min, the new wire running amount is 910 m/min, the feed speed is set according to formula 4:

$$Vx = \frac{R}{\sqrt{R^2 - (R-x)^2}} Vc \quad \text{(Formula 4)}$$

Vx is the feed speed at the cutting position x,

R is the radius of the silicon rod, x is the feed length along the cutting direction, Vc is the feed speed at the cutting position x=R, Vc=0.7 mm/min.

(2) Evaluation: The TTV (total thickness deviation) is measured by using above method GB/T29507-2013 Test method for measuring flatness, thickness and total thickness variation on silicon wafers-Automated non-contact scanning. The measurement result is shown in FIG. 9.

Embodiment 13

(1) using the diamond wire to cut silicon rod, and when the cutting feed position is 0-15% and 85-100% of the diameter of the silicon rod, the loop running amount is 750 m/min, the feed speed is 0.6 mm/min, the first new wire running amount is 880 m/min, and the first new wire running amount is adjusted to the second new wire running amount according to formula 3:

$$\text{The second new wire running amount} = \frac{R}{\sqrt{R^2 - (R-x)^2}} \times \text{The first new wire running amount,} \quad \text{(formula 3)}$$

R is the radius of the silicon rod, x is the feed length along the cutting direction.

when the cutting feed position is 15%-85% of the diameter of the silicon rod, the first loop running amount is 750 m/min, the first new wire running amount is 880 m/min, and the feed speed is adjusted according to formula 4:

$$Vx = \frac{R}{\sqrt{R^2 - (R-x)^2}} Vc \quad \text{(Formula 4)}$$

Vx is the feed speed at the cutting position x,

R is the radius of the silicon rod, x is the feed length along the cutting direction (as shown in FIG. 7), Vc is the feed speed at the cutting position x=R, Vc=0.7 mm/min.

(2) Evaluation: The TTV (total thickness deviation) is measured by using above method GB/T29507-2013 Test method for measuring flatness, thickness and total thickness variation on silicon wafers-Automated non-contact scanning. The measurement result is shown in FIG. 9.

Comparative Embodiment 2

Using the slurry to cut silicon rod and adjust the feed speed during the cutting process, the loop running amount is 540 m/min, the new wire running amount is 880 m/min, the feed speed is 0.7 mm/min.

Evaluation: The TTV (total thickness deviation) is measured by using above method GB/T29507-2013 Test method for measuring flatness, thickness and total thickness variation on silicon wafers-Automated non-contact scanning. The measurement result is shown in FIG. 8.

Conclusion: As shown in FIG. 8, TTV can significantly reduce by comparing the slurry cutting method of embodiment 9-10 and comparative embodiment 2. It is further explained that the slurry cutting method of embodiment 9-10 can not only have the same cutting ability during the cutting process, but also can further ensure the stability of the cuffing, improve the processing performance, and especially reduce the TTV value of the silicon wafer.

Comparative Embodiment 3

Using the diamond wire to cut silicon rod and adjust the feed speed during the cutting process, the loop running amount is 560 m/min, the new wire running amount is 910 m/min, the feed speed is 1.1 mm/min.

Evaluation: The TTV (total thickness deviation) is measured by using above method GB/T29507-2013 Test method for measuring flatness, thickness and total thickness variation on silicon wafers-Automated non-contact scanning. The measurement result is shown in FIG. 9.

Conclusion: As shown in FIG. 9, TTV can significantly reduce by comparing the slurry cutting method of embodiment 11-13 and comparative embodiment 3. It is further explained that the slurry cutting method of embodiment 11-13 can not only have the same cutting ability during the cutting process, but also can further ensure the stability of the cutting, improve the processing performance, and especially reduce the TTV value of the silicon wafer.

In the description of the present description, the description referring to terms “one embodiment”, “some embodiments”, “example”, “specific examples”, or “some examples” and the like means that specific features, structures, materials or characteristics described in combination with the embodiment or the example are included in at least one embodiment or example of the present disclosure. In the present description, the schematic expression of the above terms does not necessarily refer to the same embodiment or example. In addition, the specific features, structures, materials or characteristics described can be combined in any one or more embodiments or examples in suitable modes. Furthermore, in the case without mutual contradiction, the different embodiments or examples and the features of the different embodiments or examples described in the present description can be incorporated and combined by those skilled in the art.

Although the embodiments of the present disclosure are shown and described above, it should be understood that the above embodiments are exemplary, and it cannot be understood as limitation to the present disclosure. Changes, corrections, replacements and modifications can be made to the above embodiments within a scope of the present disclosure by those of ordinary skill in the art.

What is claimed is:

1. A method for cutting silicon rod, wherein comprises:

adjusting at least one of the following at different positions of a crystal cross section of the silicon rod during a cutting process: a new wire running amount, and a feed speed, or using a cooling pipe to supply a cutting fluid to a diamond wire, and using the diamond wire to cut the silicon rod, wherein a distance between a supply position of the cutting fluid and a periphery of the silicon rod is 10-20 mm, a guide plate is provided at an outlet of the cooling pipe, and that one end of the guide plate is connected to the outlet of the cooling pipe, and the other end of the guide plate is set at the supply position of the cutting fluid, a flow rate of the cutting fluid is controlled by the guide plate during the cutting process, wherein:

when a cutting depth of the diamond wire is less than ¼ diameter of the silicon rod, the flow rate of the cutting fluid is 100-120L/min;

when the cutting depth of the diamond wire is greater than ¾ diameter of the silicon rod, the flow rate of the cutting fluid is 100-120 L/min;

when the cutting depth of the diamond wire is ¼-¾ of the diameter of the silicon rod, the flow rate of the cutting fluid is 50-70 L/min.

2. The method according to claim 1, wherein two cooling pipes are used to supply the cutting fluid to the diamond wire.

3. The method for the cutting silicon rod according to claim 2, wherein the two cooling pipes are arranged symmetrically with the silicon rod, or the cooling pipe is provided with a flow regulating valve, or the cooling pipe is provided with a supporting bracket, and the supporting bracket fixes the cooling pipe.

4. The method according to claim 3, wherein the supporting bracket is an adjustment component that can move up and down, back and forth, and a spraying position of the cutting fluid is controlled by adjusting an angle of the adjustment component.

5. The method according to claim 4, wherein the angle adjustment of the adjustment component is according to the following formula:

$$\theta = \arctan\frac{\frac{y}{2} - \sqrt{R^2 - (R-x)^2}}{Z},$$

wherein, θ is an adjusted angle with a unit of degree, y is a distance between the two cooling pipes with a unit of mm, Z is a height between the cooling pipe and a spool motor with a unit of mm, the diamond wire is driven by two spool motors to run back and forth to cut the silicon rod during the cutting process, R is a diameter of the silicon rod with a unit of mm, and x is a cutting depth of the diamond wire with a unit of mm.

6. The method according to claim 1, wherein the cutting fluid is water, and an automatic water supplement device is used to supply water to the diamond wire through the cooling pipe.

7. The method according to claim 1, wherein a tension of the diamond wire is 23-25N, a linear speed of the diamond wire spool motor is 700-1500 m/min, and a cutting speed is 0.6-1.2 mm/min.

8. The method according to claim 1, wherein when adjusting at least one of the following at different positions of the crystal cross section:

the new wire running amount, and the feed speed, the method is a slurry cutting method or a diamond wire cutting method.

9. The method according to claim 8, wherein:

the method is the slurry cutting method, and the cutting feed speed is adjusted during the cutting process, wherein:

during the cutting process, a loop running amount is set to 500-800 m/min, the new wire running amount is 850-950 m/min, and the a difference between the new wire running amount and the loop running amount is greater than 5% of the loop running amount, and the feed speed is set according to formula 1:

$$Vx = \frac{R}{\sqrt{R^2 - (R-x)^2}} Vc,$$

Vx is the feed speed at the cutting position x,

R is a radius of the silicon rod, x is a feed length along the cutting direction, Vc is the feed speed at the cutting position x=R, Vc=0.6-1.2 mm/min, or, the method is the slurry cutting method, and the new wire running amount is adjusted during the cutting process, wherein:

before starting the cutting process, the loop running amount is set to 500-800 m/min, the feed speed Vc=0.6-1.2 mm/min;

after the cutting process is started, the loop running amount and the feed speed remain unchanged, the new wire running amount is adjusted according to formula 2:

$$Wx = \frac{\sqrt{R^2 - (R-x)^2}}{R^2} Wc$$

Wx is a new wire running amount at the cutting position x,

R is a radius of the silicon rod, x is a feed length along the cutting direction, Wc is the new wire running amount at the cutting position, Wc=850~950 m/min, wherein, when Wx<loop running amount×1.05, Wx=loop running amount×1.05.

10. The method according to claim 8, wherein the method is the diamond wire cutting method, during the cutting process, the new wire running amount is adjusted when the cutting feed position is 0-15% and 85-100% of the diameter of the silicon rod, and/or the cutting feed speed is adjusted when the cutting feed position is 15-85% of the diameter of the silicon rod.

11. The method according to claim 8, wherein:

the method is the diamond wire cutting method, the new wire running amount is adjusted according to the following steps:

before starting the cutting process, the loop running amount is set to 500-800 m/min, a first new wire running amount is 850-950 m/min, the feed speed is 0.6-1.2 mm/min;

after the cutting process is started, the loop running amount and the feed speed remain unchanged, the first new wire running amount is adjusted to a second new wire running amount, and the second new wire running amount is adjusted according to formula 3:

$$\text{the second new wire running amount} = \frac{R}{\sqrt{R^2 - (R-x)^2}} \times \text{The first new wire running amount,}$$

R is the radius of the silicon rod, x is the feed length along the cutting direction, or, the method is the diamond wire cutting method, the feed speed is adjusted according to the following steps:

during the cutting process, the loop running amount is set to 500~800 m/min, the new wire running amount is 850~950 m/min, the feed speed is set according to formula 4:

$$Vx = \frac{R}{\sqrt{R^2 - (R-x)^2}} Vc$$

Vx is the feed speed at the cutting position x,

R is the radius of the silicon rod, x is the feed length along the cutting direction, Vc is the feed speed at the cutting position x=R, Vc=0.6~1.2 mm/min.

12. The method according to claim 8, wherein the cutting fluid is water or water-based.

13. The method according to claim 1, wherein the feed speed or the new wire running amount is adjusted in at least 45 steps.

14. An apparatus for diamond multi-wire cutting, wherein comprises:

a fixed plate, a lifting mechanism, the lifting mechanism comprises a lifting cylinder and a lifting platform, the lifting cylinder is arranged on the lifting platform and connected with a bottom wall of the fixed plate;

a swing mechanism, the swing mechanism comprises a fixed part, a shaft pin and a rotating part, the fixed part and the rotating part are relatively rotatable connected by the shaft pin, the fixed part is connected with a bottom wall of the lifting platform, and the bottom end of the rotating part is suitable for installing a silicon rod to be cut;

a pressure detection mechanism, comprises a pressure sensing device which is arranged between the swing mechanism and the lifting mechanism, and the pressure sensing device collects a perceived stress of a wire bow for the diamond multi-wire cutting apparatus during operation.

15. The apparatus for diamond multi-wire cutting according to claim 14, wherein the pressure detection mechanism comprises:

a control processing device, the control processing device is connected to the pressure sensing device, the control processing device is connected to at least one of the lifting mechanism and/or the swing mechanism, and the control processing device analyzes and processes a pressure value feedback by the pressure sensing device and performs automatic pressure compensation by adjusting the lifting mechanism or/and the swing mechanism.

16. The apparatus for diamond multi-wire cutting according to claim 15, wherein a stable value of the wire bow is 1-3 mm.

17. The apparatus for diamond multi-wire cutting, according to claim 14, wherein the lifting mechanism further comprises a limit feed column, which is arranged between the lifting platform and the fixed plate and is parallel to the lifting cylinder.

18. The method for cutting silicon rods using an apparatus for diamond multi-wire cutting according to claim 14, wherein a swing angle $$\theta_x = \frac{\sqrt{R^2 - (R-x)^2}}{R \times \theta_M},$$

where, $\theta_x$ is the angle at the cutting position x, $\theta_M$ is the angle at the maximum cutting position, R is the radius of the silicon rod, and x is the cutting length along a feed direction.

19. The method according to claim 18, wherein the swing angle of the rotating part at a maximum cutting area is 0-12 degrees.

* * * * *